(12) United States Patent
Wang et al.

(10) Patent No.: US 10,339,409 B2
(45) Date of Patent: Jul. 2, 2019

(54) METHOD AND A DEVICE FOR EXTRACTING LOCAL FEATURES OF A THREE-DIMENSIONAL POINT CLOUD

(71) Applicant: Peking University Shenzhen Graduate School, Shenzhen (CN)

(72) Inventors: Wenmin Wang, Shenzhen (CN); Mingmin Zhen, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 21 days.

(21) Appl. No.: 15/575,897

(22) PCT Filed: Jun. 18, 2015

(86) PCT No.: PCT/CN2015/081790
§ 371 (c)(1),
(2) Date: Nov. 21, 2017

(87) PCT Pub. No.: WO2016/201671
PCT Pub. Date: Dec. 22, 2016

(65) Prior Publication Data
US 2018/0150714 A1    May 31, 2018

(51) Int. Cl.
G06K 9/46    (2006.01)
G06T 7/64    (2017.01)
(Continued)

(52) U.S. Cl.
CPC ....... G06K 9/4604 (2013.01); G06K 9/00201 (2013.01); G06K 9/42 (2013.01);
(Continued)

(58) Field of Classification Search
None
See application file for complete search history.

(56) References Cited

U.S. PATENT DOCUMENTS

| | | | |
|---|---|---|---|
| 2013/0162867 A1* | 6/2013 | Gupta | H04N 5/2621 348/239 |
| 2015/0006117 A1* | 1/2015 | Zhang | G06F 17/5004 703/1 |

(Continued)

Primary Examiner — Leon Viet Q Nguyen
(74) Attorney, Agent, or Firm — SV Patent Service (57) ABSTRACT

A method and a device for extracting local features of a 3D point cloud are disclosed. Angle information and the concavo-convex information about a feature point to be extracted and a point of an adjacent body element are calculated based on a local reference system corresponding to the points of each body element. The feature relation between the two points can be calculated accurately. The property of invariance in translation and rotation is possessed. Since concavo-convex information about a local point cloud is contained during extraction, the inaccurate extraction caused by ignoring concavo-convex ambiguity in previous 3D local feature description is resolved. During normalization processing, exponential normalization processing and second-normal-form normalization are adopted, which solves the problem of inaccurate similarity calculation caused by a circumstance that a few elements in a vector are too large or too small during feature extraction, thus improving accuracy of extracted three-dimensional local features.

8 Claims, 9 Drawing Sheets

(51) Int. Cl.
*G06K 9/42* (2006.01)
*G06T 5/40* (2006.01)
*G06K 9/00* (2006.01)

(52) U.S. Cl.
CPC .............. *G06K 9/4671* (2013.01); *G06T 5/40* (2013.01); *G06T 7/64* (2017.01); *G06T 2207/10028* (2013.01)

(56) References Cited

U.S. PATENT DOCUMENTS

2015/0317821 A1* 11/2015 Ding .................. G06T 7/00 345/420
2016/0217423 A1* 7/2016 Magnan ............... G06Q 10/103

* cited by examiner

METHOD AND A DEVICE FOR EXTRACTING LOCAL FEATURES OF A THREE-DIMENSIONAL POINT CLOUD

TECHNICAL FIELD

The present invention relates to a method and a device for extracting local features of a 3D point cloud.

BACKGROUND OF THE INVENTION

With the rapid development of 3D laser scanning technology, 3D digital geometric model has become the fourth type of digital media form after digital audio, digital image, and digital video. Its related basic theory and key technology research have been developed into a new discipline—digital geometric processing, and are used widely in the computer-aided design, animation industry, bio-medicine, digital cultural heritage protection and other fields. In addition, with the rise of hardware devices such as Microsoft Kinect and Primesense (a somatosensory technology), the access to 3D (3 Dimensions) point cloud information has become more convenient. In 3D vision, local feature extraction has been the most critical part of point cloud processing. Local feature descriptors are used to describe the local features of the extracted point cloud. Therefore, for both 3D object recognition and 3D reconstruction field, local feature descriptors play a very important role.

At present, the research results of 3D local feature descriptors (and 3D local feature extraction) are basically divided into three categories: one is based on signature, which calculates the signature of a local point cloud to describe its features, including Point Signature, 3D Point Fingerprint, 3D-SURF, etc.; the second one is based on histograms, which calculates the histogram of a local point cloud to describe the local features, including Spin Image and 3D Shape Contexts; the third one is the 3D local feature descriptor SHOT containing signatures and histograms which is recently proposed. The descriptor SHOT combines the advantages of signatures and histograms and can be widely used in 3D point cloud processing.

However, the three 3D local feature descriptors in the prior art ignore the concavo-convex features of the point cloud surface, so that the extracted local features are prone to ambiguity, and thus inaccurate extraction often occurs during 3D point cloud processing. The accuracy of local feature extraction in the technologies still needs to be improved.

SUMMARY OF THE INVENTION

The present disclosure provides a method and a device for extracting local features of a 3D point cloud, which can improve the accuracy of local feature extraction of a 3D point cloud.

In some embodiments, a method for extracting local features of a 3D point cloud includes: calculating angle information about a local feature point to be extracted and points of each body element in a pre-set point cloud sphere and calculating concavo-convex information about a curved surface between the local feature point to be extracted and the points of each body element respectively, wherein the pre-set point cloud sphere contains various body elements, and the body element is adjacent to the local feature point to be extracted; computing histogram statistics according to the angle information and the concavo-convex information, and generating a histogram corresponding to each body element; connecting various histograms corresponding to each body element in the pre-set point cloud sphere on a one-to-one basis, to obtain an extracted vector; and performing exponential normalization processing and second-normal-form normalization processing on the extracted vector.

In some embodiments, a device for extracting local features of a 3D point cloud includes: a first calculating unit that can calculate angle information about a local feature point to be extracted and points of each body element in a pre-set point cloud sphere respectively; a second calculating unit that can calculate concavo-convex information about a curved surface between the local feature point to be extracted and the points of each body element, wherein the pre-set point cloud sphere contains various body elements, and the body element is adjacent to the local feature point to be extracted; a statistics unit that can compute histogram statistics according to the angle information calculated by the first calculating unit and the concavo-convex information calculated by the second calculating unit, and generating a histogram corresponding to each body element; a vector extraction unit that can connect various histograms calculated by the vector extraction unit corresponding to the body element in the pre-set point cloud sphere on a one-to-one basis, to obtain an extracted vector; and a normalization processing unit that can perform exponential normalization processing and second-normal-form normalization processing on the extracted vector extracted by the normalization processing unit.

In some embodiments, a method and a device for extracting local features of a 3D point cloud are provided. Angle information and the concavo-convex information about a feature point to be extracted and a point of an adjacent body element are calculated based on a local reference system corresponding to the points of each body element, and the feature relation between the two points can be calculated accurately. The property of invariance in translation and rotation is possessed. In addition, since concavo-convex information about a local point cloud is contained during extraction, the problem of inaccurate extraction caused by ignoring concavo-convex ambiguity in previous 3D local feature description is solved. During normalization processing, exponential normalization processing and second-normal-form normalization are adopted, and the problem of inaccurate similarity calculation caused by a circumstance that a few elements in a vector are too large or too small during feature extraction is solved, so that the accuracy of extracted three-dimensional local features can be improved.

DETAILED DESCRIPTION OF THE INVENTION

The present invention is further described below in details by specific embodiments with reference to the attached schematic drawings.

In some embodiments, a method for extracting local features of a 3D point cloud is provided to improve the accuracy of extracting local features of a 3D point cloud.

Embodiment 1

Figure 1:
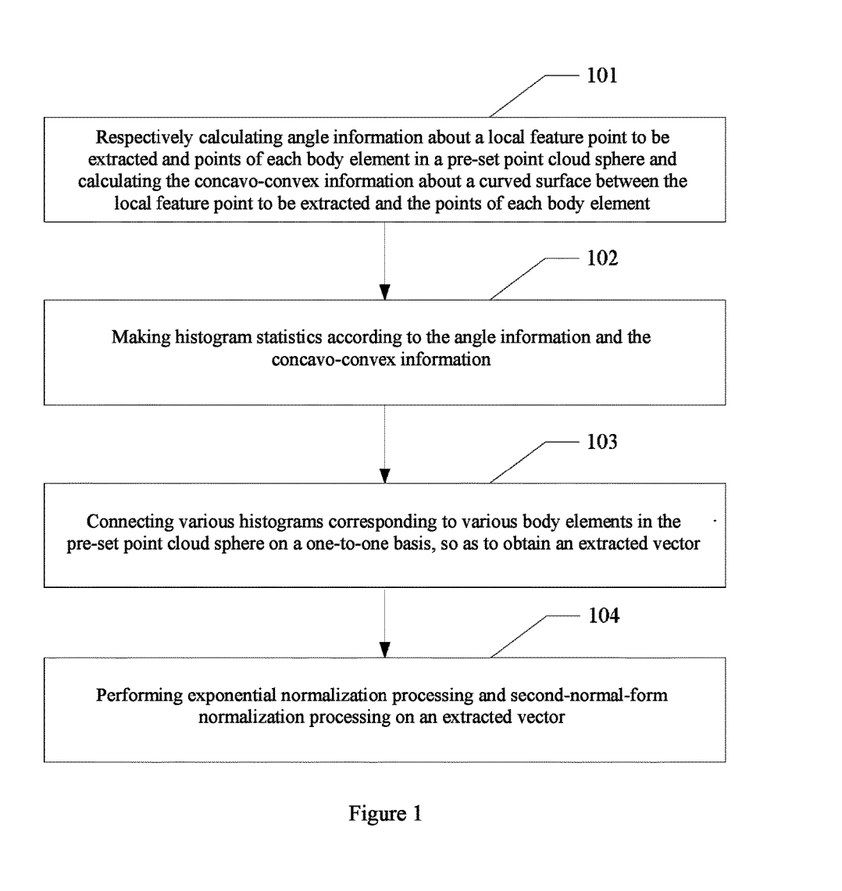
FIG. 1 shows a flowchart of a method for extracting local features of a 3D point cloud in accordance with some embodiments of the present invention.

FIG. 1 illustrates a flowchart of a method for extracting local features of a 3D point cloud, which can include the steps of:

Step 101: calculating angle information about a local feature point to be extracted and points of each body element in a pre-set point cloud sphere and calculating concavo-convex information about a curved surface between the local feature point to be extracted and the points of each body element, respectively, wherein the pre-set point cloud sphere contains various body elements, and the body element is adjacent to the local feature point to be extracted.

It should be noted that, calculating angle information about a local feature point to be extracted and points of each body element in a pre-set point cloud sphere and calculating concavo-convex information about a curved surface between the local feature point to be extracted and the points of each body element is not based on the traditional coordinate system. Different local reference systems are designed for the points of each body element. In particular, calculate the covariance matrix first, and decompose the covariance matrix by the feature to obtain the feature vectors; and then sort the feature vectors in descending order. At last, align the feature vectors for de-ambiguity calculation, to obtain the local reference system corresponding to the points of each body element.

Step 102: computing histogram statistics according to the angle information and the concavo-convex information.

Generate a histogram corresponding to each body element.

Step 103: connecting various histograms corresponding to various body elements in the pre-set point cloud sphere on a one-to-one basis, to obtain an extracted vector.

Step 104: performing exponential normalization processing and second-normal-form normalization processing on an extracted vector.

A method for extracting local features of a 3D point cloud provided. Angle information and the concavo-convex information about a feature point to be extracted and a point of an adjacent body element are calculated based on a local reference system corresponding to the points of each body element, and the feature relation between the two points can be calculated accurately. The property of invariance in translation and rotation is possessed. In addition, since concavo-convex information about a local point cloud is contained during extraction, the problem of inaccurate extraction caused by ignoring concavo-convex ambiguity in previous 3D local feature description is solved. During normalization processing, exponential normalization processing and second-normal-form normalization are adopted, and the problem of inaccurate similarity calculation caused by a circumstance that a few elements in a vector are too large or too small during feature extraction is solved, so that the accuracy of extracted three-dimensional local features can be improved.

Embodiment 2

Figure 2:
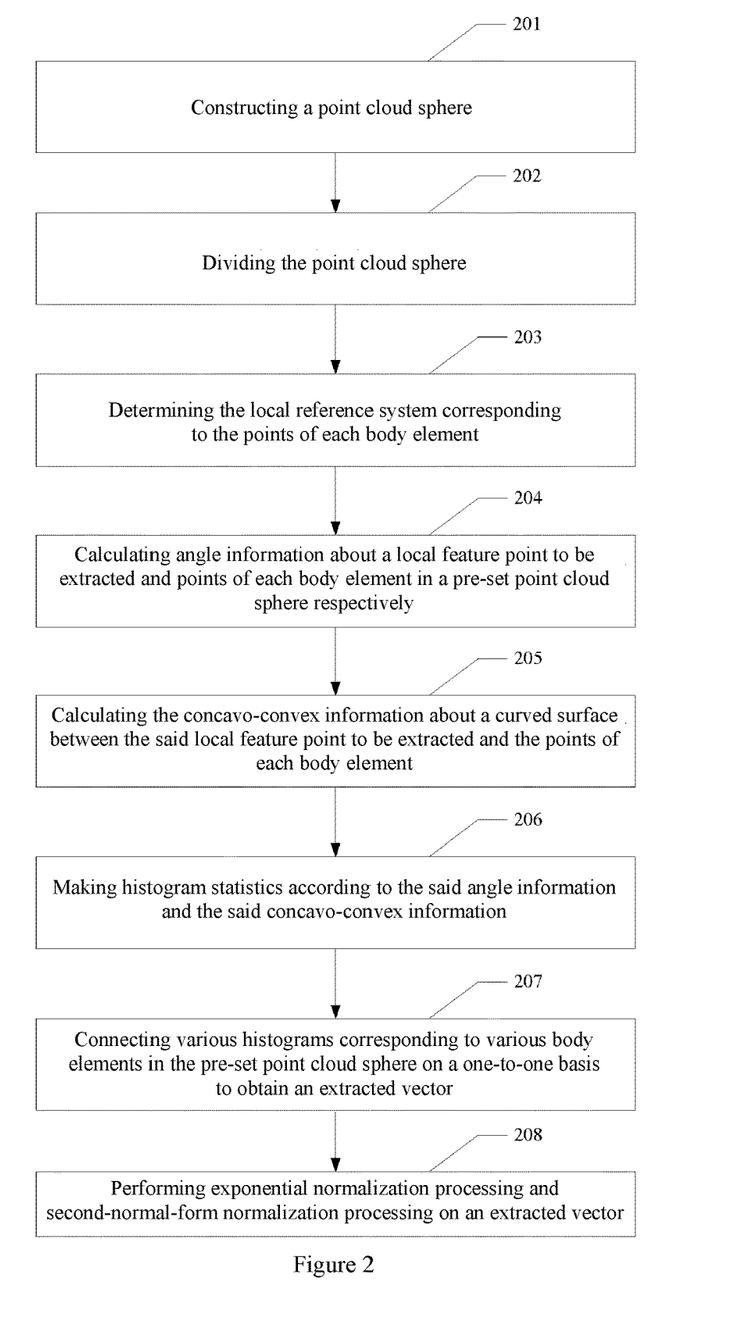
FIG. 2 shows another flowchart of a method for extracting local features of a 3D point cloud in accordance with some embodiments of the present invention.

The process of the present embodiment is basically the same as Embodiment 1, except that in the present embodiment, a cloud sphere is constructed for the local feature point to be extracted before calculating the angle information and the concavo-convex information, and the cloud sphere is divided into various body elements adjacent to the local feature point. FIG. 2 illustrates another flowchart of a method for extracting local features of a 3D point cloud, which includes comprise the steps of:

Step 201: constructing a point cloud sphere.

Constructing a point cloud sphere with the local feature point to be extracted as the center and the pre-set length as the radius.

Step 202: dividing the point cloud sphere.

Dividing the point cloud sphere along the direction angle, the elevation angle and the radius to obtain a number of body elements adjacent to the local feature point to be extracted.

Step 203: determining the local reference system corresponding to the points of each body element.

Figure 3:
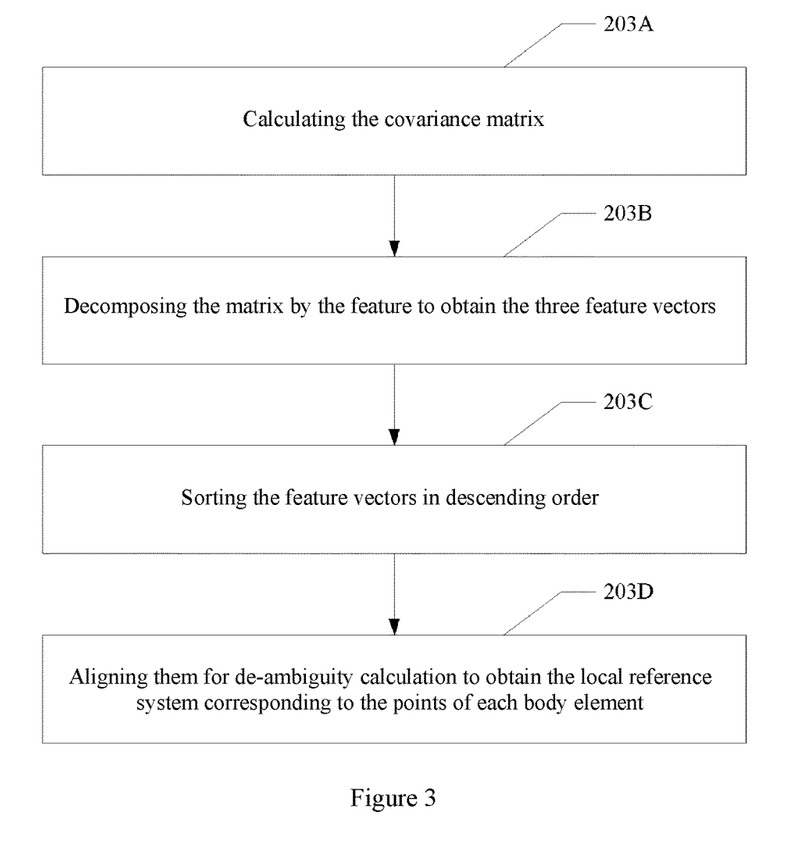
FIG. 3 shows a flowchart for determining the local reference system corresponding to the points of each body element.

Referring to FIG. 3, the local reference system is determined as follows:

Step 203A: calculating the covariance matrix M by using the formula (1).

$$M = \frac{1}{Z} \sum_{i:d_i \leq R} (R - d_i)(p' - p)(p' - p), \tag{1}$$

wherein R is the radius of the point cloud sphere, p' is the point of each body element, p is the local feature point and $$d_i = \|p' - p\|_2 \text{ and } Z = \sum_{i:d_i \leq R} (R - d_i).$$

Step 203B: decomposing the covariance matrix M by the feature to obtain the three feature vectors.

Step 203C: sorting the feature vectors in descending order as the roll axis x, the heading axis y and the pitch axis z of the local reference system, respectively.

Step 203D: aligning the feature vectors for de-ambiguity calculation, to obtain the local reference system corresponding to the points of each body element.

Step 204: calculating the angle information about a local feature point to be extracted and points of each body element in a pre-set point cloud sphere, respectively.

Figure 4:
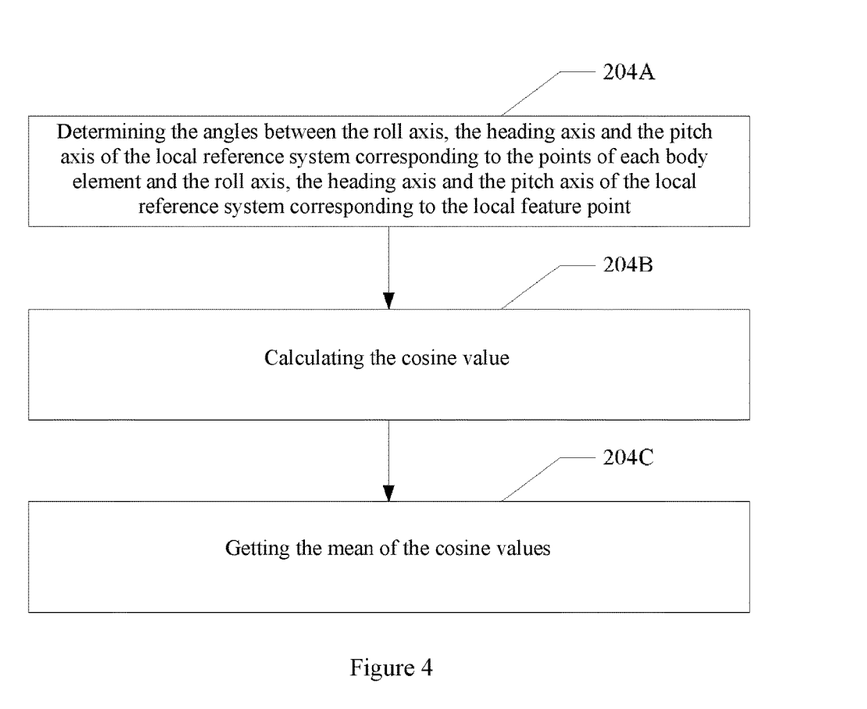
FIG. 4 shows a flowchart for calculating angle information about a local feature point to be extracted and points of each body element in a pre-set point cloud sphere.

Referring to FIG. 4, the specific process is as follows:

Step 204A: determining the angle $\alpha$ between the roll axis of the local reference system corresponding to the points of each body element and the roll axis of the local reference system corresponding to the local feature point, the angle $\beta$ between the heading axis of the local reference system and the heading axis of the local reference system corresponding to the local feature point, and the angle $\theta$ between the pitch axis local of the reference system and the pitch axis of the local reference system corresponding to the local feature point.

Step 204B: calculating the cosine of angles $\alpha$, $\beta$ and $\theta$, respectively, that is, $\cos \alpha$, $\cos \beta$ and $\cos \theta$.

Step 204C: obtaining the mean to obtain the angle information of the point of the body element, as follows:

$$\tau = \frac{\cos\alpha + \cos\beta + \cos\theta}{3}$$

Step 205: calculating the concavo-convex information about a curved surface between the local feature point to be extracted and the points of each body element.

The specific process is as follows:

1. Calculating $\kappa(p,p')=<p-p',N(p)-N(p')>$, wherein p is the local feature point to be extracted, p' is the point of the body element, and N(p) and N(p') are the normal lines of point p and p', respectively;

2. Calculating the concavo-convex information D by using the formula (2).

$$D = \begin{cases} 1, \kappa(p, p') > 0 \\ -1, \text{otherwise} \end{cases} \quad (2)$$

It is to be understood that Step 204-205 may be implemented in any order, which is not limited to the example described herewith.

Step 206: computing histogram statistics according to the angle information and the concavo-convex information.

Calculating histogram $\phi$ corresponding to various body elements according to the concavo-convex information D obtained in Step 205 and the angle information $\tau$ obtained in Step 204 by using the formula (3);

$$\phi = D(\tau+1) \quad (3)$$

Step 207: connecting various histograms corresponding to various body elements in the pre-set point cloud sphere on a one-to-one basis, to obtain an extracted vector.

Step 208: performing exponential normalization processing and second-normal-form normalization processing on an extracted vector.

A concrete example of the method is described below for extracting local features of a 3D point cloud.

The point adjacent to the feature point is searched by using a KD tree (k-dimensional tree, a data structure that divides the k-dimensional data space) based on a given neighborhood radius (typically 15 times of resolution of the point cloud). In this way, a point cloud sphere with a feature point as the center is determined.

The point cloud sphere is divided along the direction angle, the elevation angle and the radius. The point cloud sphere is divided into 8 parts along the direction angle, 2 parts along the elevation angle and 2 parts along the radius, totally 32 body elements.

With respect to the points of each body element, calculate the concavo-convex information and the angle information between each point and the feature point, and then obtain the histogram corresponding to the body element.

1. A local reference system corresponding to the points of each body element is used in the calculation process. The estimation of the local reference system mainly comprises the following steps:

Step 30: calculating a covariance matrix M:

$$M = \frac{1}{Z} \sum_{i:d_i \leq R} (R - d_i)(p' - p)(p' - p)$$

wherein R is the radius of the point cloud sphere, p' is the point of the body element, p is local feature point, $$d_i = \|p' - p\|_2 \text{ and } Z = \sum_{i:d_i \leq R} (R - d_i).$$

Step 31: decomposing the covariance matrix M by the feature to obtain the feature vectors.

Step 32: sorting the feature vectors in descending order as the roll axis x, the heading axis y and the pitch axis z of the local reference system, respectively.

Step 33: aligning the feature vectors for de-ambiguity calculation, to obtain the local reference system corresponding to the local feature point.

Figure 5:
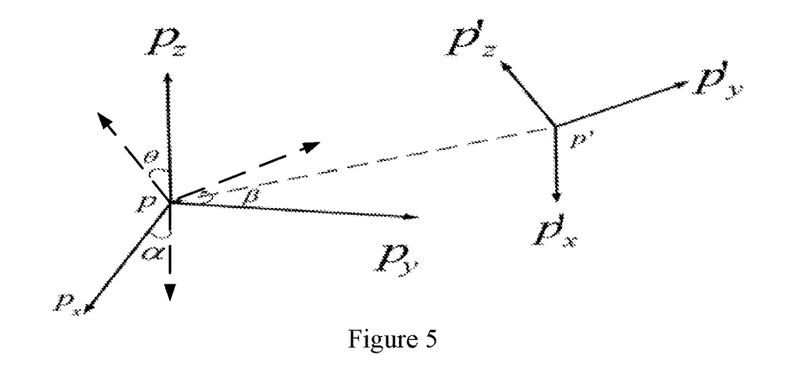
FIG. 5 is a schematic view of the angle information between local reference systems of two points.

2. After obtaining a local reference system corresponding to each point, calculating the angle information between the points of each body element and the feature point. Here the method of calculating average cosine value is used. Referring to FIG. 5, the angles between the local reference systems of point p and point p' are $\alpha$, $\beta$ and $\theta$, respectively, where the mean of the cosine values of the three angles is calculated directly.

$$\tau = \frac{\cos\alpha + \cos\beta + \cos\theta}{3}$$

3. For the calculation of concavo-convex information, calculating the following first:

$$\kappa(p,p')=<p-p',N(p)-N(p')>,$$

wherein N(x) and N(y) are the normal lines of point x and y, respectively. Using the symbol D to represent the concavo-convex of the curved surface between the two points, which is determined as follows:

$$D = \begin{cases} 1, \kappa(p, p') > 0 \\ -1, \text{otherwise} \end{cases},$$

wherein p is the local feature point to be extracted, and p' is the point of the body element.

4. After obtaining the angle information τ and the concavo-convex information D of the reference system between the points of each body element and the feature point, calculate the histogram φ corresponding to various body elements according to the angle information and the concavo-convex information.

$\phi = D(\tau+1)$, wherein φ is used to describe the angle information and concavo-convex information between the neighborhood point and the feature point. The position of the neighborhood point in the histogram can be determined according to the obtained φ.

Connecting various histograms corresponding to various body elements, to obtain a vector for describing the feature point.

Performing normalization on the descriptors at last, including exponential normalization processing and second-normal-form normalization in the present prevention.

The exponential normalization is the exponential calculation of the components of the feature, wherein the function f is used as follows:

$f(c) = c^\alpha$, wherein $C$ is a body element.

All body elements of the feature descriptor are calculated by using the function $f$, and the resulting descriptor is normalized by the second-normal-form normalization to obtain the final 3D local feature descriptor based on the unique angle histogram signature.

Figure 6A:
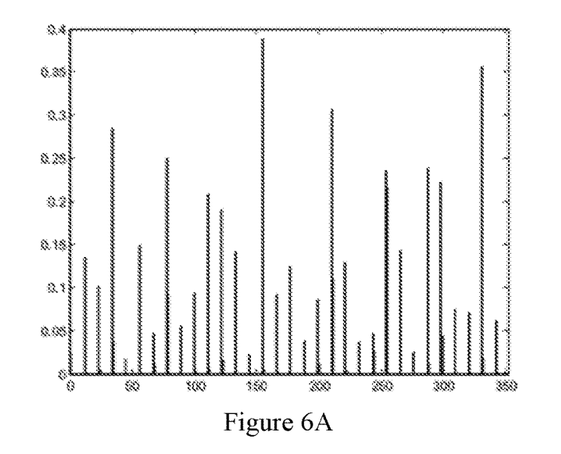
FIG. 6A illustrates a histogram of feature descriptors obtained by the second-normal-form normalization.
Figure 6B:
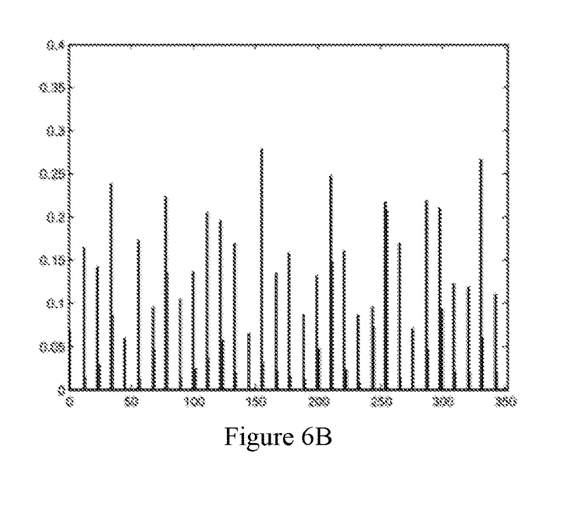
FIG. 6B illustrates a histogram of feature descriptors obtained by the exponential normalization and the second-normal-form normalization.

FIG. 6A illustrates the histogram for a point randomly selected in the experiment obtained only by second-normal-form normalization. FIG. 6B illustrates the histograms of the point obtained by exponential normalization and second-normal-form normalization. It can be seen that the exponential normalized histogram (FIG. 6B) appears to be smoother, which is more accurate for the descriptor, and will not affect the final matching results due to the circumstance that components of the descriptor are too high or too low.

The 3D local feature descriptor based on the unique angle histogram signature can be used to describe not only the local feature of a point cloud without RGB (industrial color standard) information, but also the local feature of a point cloud with RGB.

Figure 7A:
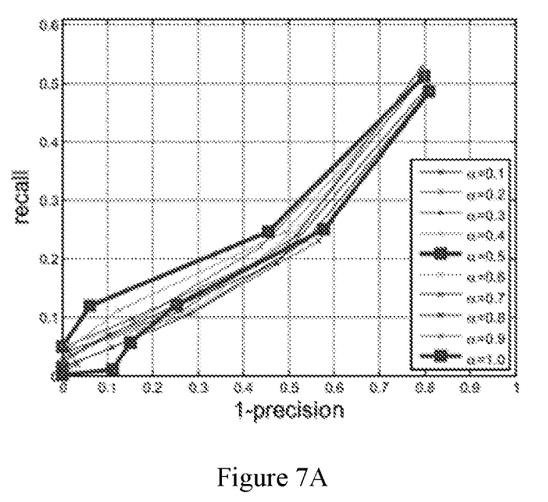
FIG. 7A illustrates a line chart of rate of recall and accuracy of the different parameters α in the data set of a point cloud without RBG.
Figure 7B:
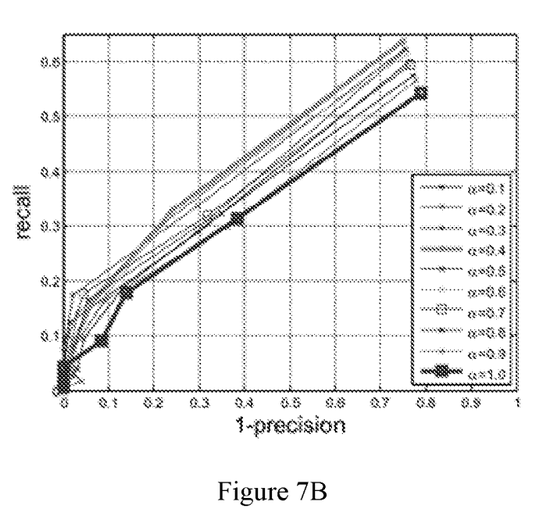
FIG. 7B illustrates a line chart of rate of recall and accuracy of the different parameters α in the point cloud in the real scene.

During the experiment, mainly two types of data are used: the synthesized point cloud without RGB and the real point cloud acquired by 3D equipment. For the parameter a after exponential normalization processing, the experimental results are shown in FIG. 7A-7A. FIG. 7A illustrates the line chart of rate of recall and accuracy of the different parameters α in the data set of a point cloud without RGB. FIG. 7A illustrates the line chart of rate of recall and accuracy of the different parameters α in the point cloud in the real scene. It can be seen that the feature descriptor has the best effect when α is 0.5.

Figure 8:
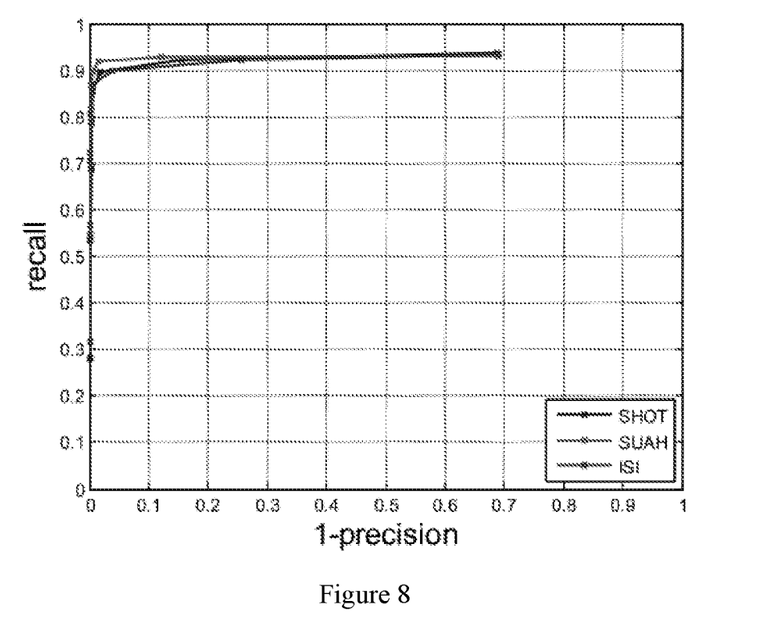
FIG. 8 shows a comparison of the local feature descriptor obtained by the disclosed method with other feature descriptors in the presence of noise.
Figure 9:
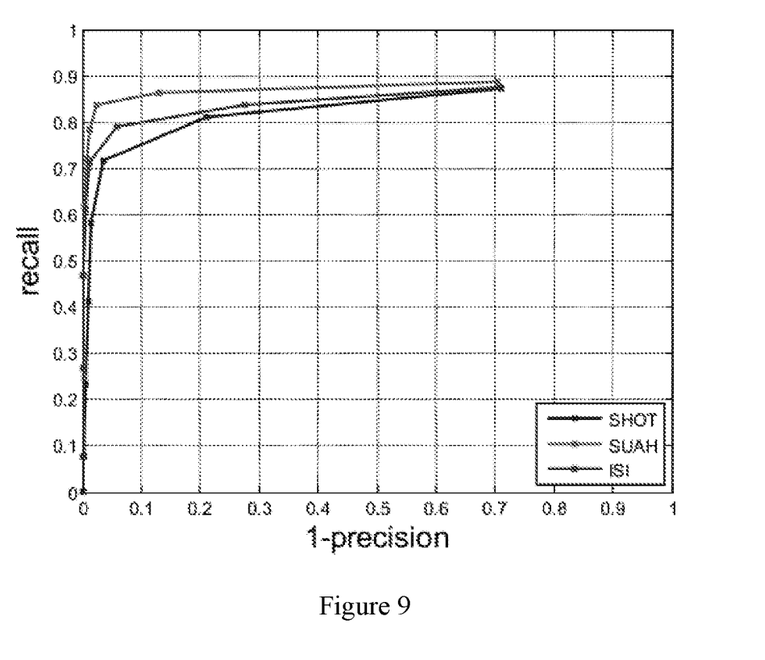
FIG. 9 illustrates a comparison of the local feature descriptor obtained by the disclosed method with other feature descriptors in the presence of noise.
Figure 10:
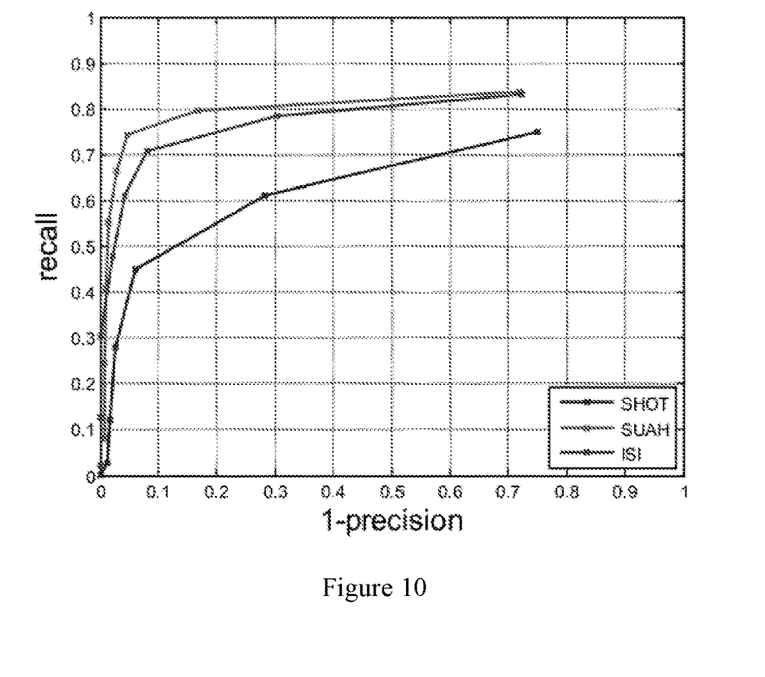
FIG. 10 illustrates a comparison of the local feature descriptor obtained by the disclosed method with other feature descriptors in the presence of noise.
Figure 11:
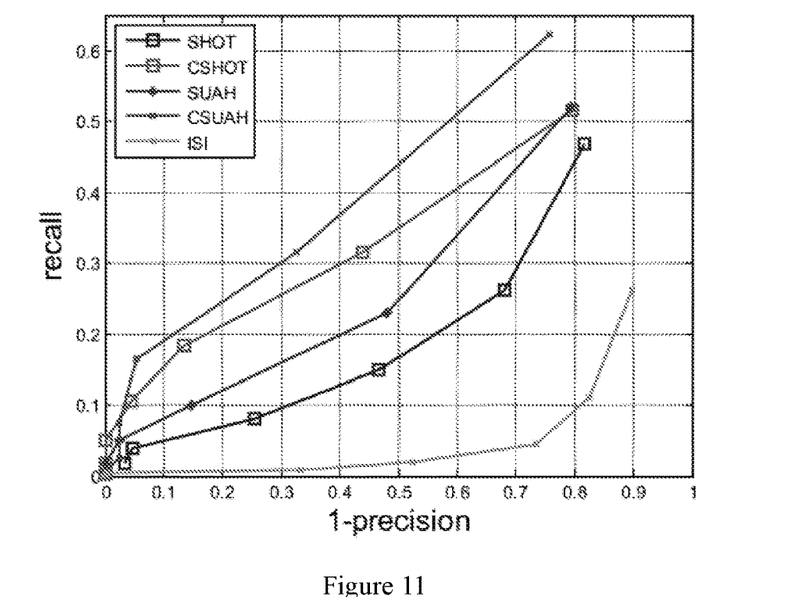
FIG. 11 illustrates a comparison of the local feature descriptor obtained by the disclosed method with other feature descriptors in the real scene.

Referring to FIG. 8-10, it can be seen that the 3D local feature descriptors (SUAH) obtained by using the disclosed method shows better effect than other feature descriptors (SHOT, ISI) under different noise. In FIG. 11, it can be seen that the 3D local feature descriptors (SUAH and CSUAH) obtained by using the disclosed method shows better effect than other feature descriptors (SHOT, CSHOT, ISI) in the real scene.

Embodiment 3

Figure 12:
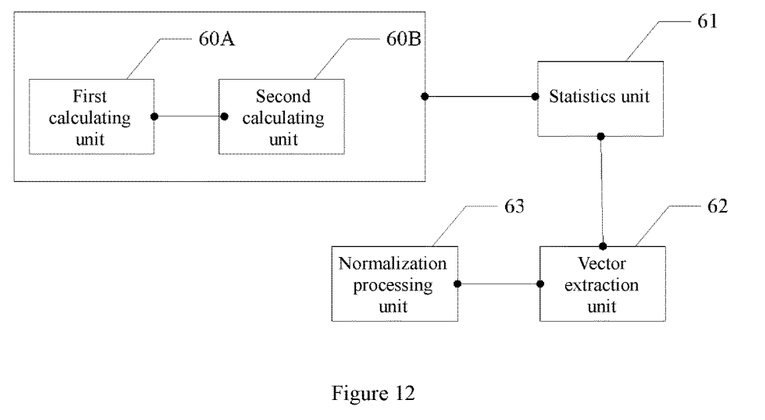
FIG. 12 is a schematic view of a device in accordance with some embodiments of the present invention.

In some embodiments, FIG. 12 illustrates a schematic view of a device, which includes:

A first calculating unit 60A can calculate angle information about a local feature point to be extracted and points of each body element in a pre-set point cloud sphere respectively. A second calculating unit 60B can calculate concavo-convex information about a curved surface between the local feature point to be extracted and the points of each body element, wherein the pre-set point cloud sphere contains various body elements, and the body element is adjacent to the local feature point to be extracted.

A statistics unit 61 can compute histogram statistics according to the angle information calculated by the first calculating unit 60A and the concavo-convex information calculated by the second calculating unit 60B, and generating the histogram corresponding to each body element, and A vector extraction unit 62 can connect various histograms calculated by the vector extraction unit 61 corresponding to the body element in the pre-set point cloud sphere on a one-to-one basis, to obtain an extracted vector.

A normalization processing unit 63 can perform exponential normalization processing and second-normal-form normalization processing on the extracted vector extracted by the normalization processing unit 62.

Figure 13:
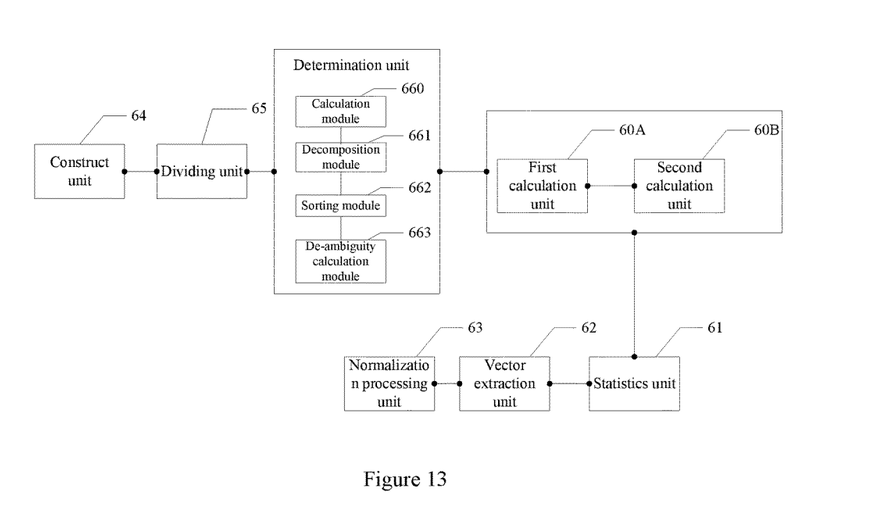
FIG. 13 is a schematic view of another device in accordance with some embodiments of the present invention.

Referring to FIG. 13, the disclosed device can further include:

A construct unit 64 can construct a point cloud sphere with the local feature point to be extracted as the center and the pre-set length as the radius, and A dividing unit 65 can divide the point cloud sphere along the direction angle, the elevation angle and the radius to obtain a number of body elements adjacent to the local feature point to be extracted.

The disclosed device can further include a determination unit 66 can determine the local reference system corresponding to the points of each body element. In particular, the determination unit 66 include:

A calculation module 660 can calculate the covariance matrix M by using the formula (1):

$$M = \frac{1}{Z} \sum_{i:d_i \leq R} (R - d_i)(p' - p)(p' - p), \qquad (1)$$

wherein R is the radius of the point cloud sphere, p' is the point of each body element, p is the local feature point, $$d_i = \|p' - p\|_2 \text{ and } Z = \sum_{i:d_i \leq R} (R - d_i).$$

A decomposition module 661 can decompose the covariance matrix M by the feature to obtain the values of three feature vectors.

A sorting module 662 can sort the feature vectors in descending order as the roll axis x, the heading axis y and the pitch axis z of the local reference system, respectively.

A de-ambiguity calculation module 663 can align the feature vectors for de-ambiguity calculation, to obtain the local reference system.

In the disclosed device, in some embodiments, the first calculating unit 60A is configured for:

determining the angle α between the roll axis of the local reference system corresponding to the points of each body element and the roll axis of the local reference system corresponding to the local feature point, the angle β between the heading axis of the local reference system and the heading axis of the local reference system corresponding to the local feature point, and the angle θ between the pitch axis local of the reference system and the pitch axis of the local reference system corresponding to the local feature point;

calculating the cosine of angle α, β and θ, respectively, that is, cos α, cos β and cos θ; and obtaining the mean to obtain the angle information of the point of the body element:

$$\tau = \frac{\cos\alpha + \cos\beta + \cos\theta}{3}.$$

In the disclosed device, in particular, the second calculating unit 60B is configured for:

calculating κ(p,p')=<p−p',N(p)−N(p')>, wherein p is the local feature point to be extracted, p' is the point of the body element, N(p) and N(p') are the normal lines of point p and p', respectively; and calculating the concavo-convex information D by using the formula (2);

$$D = \begin{cases} 1, & \kappa(p, p') > 0 \\ -1, & \text{otherwise} \end{cases} \quad (2)$$

In a device according to a preferred embodiment, in particular, the statistics unit 61 can calculate the histogram φ corresponding to various body elements according to the concavo-convex information D obtained by the second calculating unit 60B and the angle information τ obtained by the first calculating unit 60A by using the formula (3).

$$\phi = D(\tau+1) \quad (3)$$

The above contents are further detailed description in connection with the disclosed embodiments. The invention is not limited to the embodiments referred to, but may be varied and modified by those skilled in the field without departing from the idea and scope of the present invention.

What is claimed is:

1. A method for extracting local features of a 3D point cloud, comprising:
   determining the local reference system corresponding to the points of each body element, comprising:
   calculating a covariance matrix M;
   decomposing the covariance matrix M to obtain three feature vectors;
   sorting the three feature vectors in descending order as the roll axis x, the heading axis y and the pitch axis z of the local reference system respectively; and
   aligning the three feature vectors for de-ambiguity calculation, to obtain the local reference system corresponding to the points of each body element, wherein the covariance matrix M is calculated using $$M = \frac{1}{Z}\sum_{i:d_i \leq R}(R-d_i)(p'-p)(p'-p), \quad (1)$$

wherein R is the radius of the point cloud sphere, p' is a point of each body element, p is a local feature point, $$d_i = \|p' - p\|_2 \text{ and } Z = \sum_{i:d_i \leq R}(R-d_i);$$

calculating angle information about a local feature point to be extracted and points of each body element in a pre-set point cloud sphere;

calculating concavo-convex information about a curved surface between the local feature point to be extracted and the points of each body element respectively, wherein the pre-set point cloud sphere contains various body elements, and the body elements are adjacent to the local feature point to be extracted;

computing histogram statistics according to the angle information and the concavo-convex information;

generating histograms each corresponding to each body element;

connecting the histograms corresponding to the body elements in the pre-set point cloud sphere on a one-to-one basis, to obtain an extracted vector; and performing exponential normalization processing and second-normal-form normalization processing on the extracted vector.

2. The method of claim 1, further comprising:
   before the step of calculating angle information about a local feature point, constructing a point cloud sphere with the local feature point to be extracted as a center and a pre-set length as the radius; and
   dividing the point cloud sphere along the direction angle, the elevation angle and the radius to obtain a number of body elements adjacent to the local feature point to be extracted.

3. The method of claim 1, wherein the step of calculating angle information about a local feature point to be extracted and points of each body element in a pre-set point cloud sphere comprises:
   determining an angle α between the roll axis of the local reference system corresponding to the points of each body element and the roll axis of the local reference system corresponding to the local feature point, an angle β between the heading axis of the local reference system and the heading axis of the local reference system corresponding to the local feature point, and an angle θ between the pitch axis local of the reference system and the pitch axis of the local reference system corresponding to the local feature point;
   calculating cosines of the angles α, β and θ to obtain cos α, cos β and cos θ;
   computing a mean of the cosines values to obtain angle information τ of the point of the body element using:

$$\tau = \frac{\cos\alpha + \cos\beta + \cos\theta}{3};$$

calculating concavo-convex information about a curved surface between the local feature point to be extracted and the points of each body element, comprising:

calculating κ(p,p')=<p−p',N(p)−N(p')>, wherein p is the local feature point to be extracted, p' is a point of the body element, and N(p) and N(p') are normal lines of point p and point p', respectively; and calculating a concavo-convex information D using:

$$D = \begin{cases} 1, \kappa(p, p') > 0 \\ -1, \text{otherwise} \end{cases}.$$

4. The method of claim 3, wherein the step of making histogram statistics comprises:

calculating a histogram $\phi$ corresponding to various body elements according to the concavo-convex information D and the angle information $\tau$ using:

$$\phi = D(\tau+1) \quad (3).$$

5. A device for extracting local features of a 3D point cloud, comprising:

a determination unit configured to determine the local reference system corresponding to the points of each body element, wherein the determination unit is configured to calculate a covariance matrix M;

to decompose the covariance matrix to obtain three feature vectors;

to sort the three feature vectors in descending order as the roll axis x, the heading axis y and the pitch axis z of the local reference system, respectively; and to align the three feature vectors for de-ambiguity calculation, to obtain the local reference system wherein the covariance matrix M is calculated using $$M = \frac{1}{Z} \sum_{i:d_i \leq R} (R - d_i)(p' - p)(p' - p), \quad (1)$$

wherein R is the radius of the point cloud sphere, p' is a point of each body element, p is a local feature point, $$d_i = \|p' - p\|_2 \text{ and } Z = \sum_{i:d_i \leq R} (R - d_i);$$

a first calculating unit configured to calculate angle information about a local feature point to be extracted and points of each body element in a pre-set point cloud sphere respectively;

a second calculating unit configured to calculate concavo-convex information about a curved surface between the local feature point to be extracted and the points of each body element, wherein the pre-set point cloud sphere contains various body elements, and the body elements are adjacent to the local feature point to be extracted;

a statistics unit configured to compute histogram statistics according to the angle information calculated by the first calculating unit and the concavo-convex information calculated by the second calculating unit, and generating histograms each corresponding to each body element;

a vector extraction unit configured to connect the histograms calculated by the vector extraction unit corresponding to the body elements in the pre-set point cloud sphere on a one-to-one basis, to obtain an extracted vector; and a normalization processing unit configured to perform exponential normalization processing and second-normal-form normalization processing on the extracted vector extracted by the normalization processing unit.

6. The device of claim 5, further comprising:

a construct unit configured to construct a point cloud sphere with the local feature point to be extracted as the center and a pre-set length as the radius; and a dividing unit configured to divide the point cloud sphere along the direction angle, the elevation angle and the radius to obtain a number of body elements adjacent to the local feature point to be extracted.

7. The device of claim 5, wherein the first calculating unit is configured:

to determine an angle $\alpha$ between the roll axis of the local reference system corresponding to the points of each body element and the roll axis of the local reference system corresponding to the local feature point, an angle $\beta$ between the heading axis of the local reference system and the heading axis of the local reference system corresponding to the local feature point, and an angle $\theta$ between the pitch axis local of the reference system and the pitch axis of the local reference system corresponding to the local feature point;

to calculate cosines of angles $\alpha$, $\beta$ and $\theta$ to obtain cos $\alpha$, cos $\beta$ and cos $\theta$;

to obtain a mean of the cosines to obtain angle information $\tau$ of the point of the body element using:

$$\tau = \frac{\cos\alpha + \cos\beta + \cos\theta}{3},$$

wherein the second calculating unit is configured to calculate $\kappa(p,p') = \langle p=p', N(p)-N(p') \rangle$, wherein p is the local feature point to be extracted, p' is a point of the body element, and N(p) and N(p') are normal lines of point p and point p', respectively; and to calculate a concavo-convex information D using:

$$D = \begin{cases} 1, \kappa(p, p') > 0 \\ -1, \text{otherwise} \end{cases}.$$

8. The device of claim 7, wherein the statistics unit is configured to calculate a histogram $\phi$ corresponding to various body elements according to the concavo-convex information D and the angle information $\tau$ using:

$$\phi = D(\tau+1) \quad (3).$$

* * * * *